US009534760B2

(12) United States Patent
Sander et al.

(10) Patent No.: US 9,534,760 B2
(45) Date of Patent: Jan. 3, 2017

(54) LIGHTING ARRANGEMENT FOR A MOTOR VEHICLE

(71) Applicant: Dr. Ing. h.c. F. Porsche Aktiengesellschaft, Stuttgart (DE)

(72) Inventors: Holger Sander, Tiefenbronn (DE); Pascal Leidenberger, Gueglingen (DE); Dirk Brinkmann, Wiernsheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/849,611

(22) Filed: Sep. 10, 2015

(65) Prior Publication Data

US 2016/0084471 A1 Mar. 24, 2016

(30) Foreign Application Priority Data

Sep. 18, 2014 (DE) ........................ 10 2014 113 491

(51) Int. Cl.
*B60Q 1/00* (2006.01)
*F21S 8/10* (2006.01)
*F21W 101/10* (2006.01)

(52) U.S. Cl.
CPC .............. *F21S 48/335* (2013.01); *F21S 48/10* (2013.01); *F21S 48/325* (2013.01); *F21W 2101/10* (2013.01)

(58) Field of Classification Search
CPC ........ F21S 48/10; F21S 48/325; F21S 48/335; F21S 48/326; F21S 48/337; F21W 2101/00
USPC .......................................................... 362/547
See application file for complete search history.

(56) References Cited

U.S. PATENT DOCUMENTS

| | | | | |
|---|---|---|---|---|
| 5,207,497 A * | 5/1993 | Kamishina | F21S 48/337 | 362/294 |
| 5,406,467 A * | 4/1995 | Hashemi | F21S 48/337 | 362/294 |
| 5,700,080 A | 12/1997 | Okuda | | |
| 6,071,000 A * | 6/2000 | Rapp | F21S 48/335 | 362/362 |
| 2008/0182502 A1* | 7/2008 | Bartlett | F21S 48/332 | 454/241 |
| 2009/0268475 A1* | 10/2009 | Ball | F21S 48/328 | 362/373 |

(Continued)

FOREIGN PATENT DOCUMENTS

| | | |
|---|---|---|
| DE | 102006028295 A1 | 12/2007 |
| DE | 102006046439 A1 | 3/2008 |

(Continued)

*Primary Examiner* — Ali Alavi
(74) *Attorney, Agent, or Firm* — Leydig, Voit & Mayer, Ltd.

(57) ABSTRACT

A lighting arrangement includes a lighting chamber having a light-permeable section and a ventilation opening with a filtering membrane. A light source for supplying light is arranged in the lighting chamber. A ventilation arrangement is assigned to the ventilation opening so as to supply ambient air through the ventilation opening to the lighting chamber. The ventilation arrangement includes an air outlet opening assigned to the ventilation opening of the lighting chamber so as to supply the ambient air to the ventilation opening. A distance between the air outlet opening and the filtering membrane is configured so as to be adjustable.

13 Claims, 2 Drawing Sheets

(56) References Cited

U.S. PATENT DOCUMENTS

2010/0232167 A1* 9/2010 Michalak .............. F21S 48/335
362/362

FOREIGN PATENT DOCUMENTS

DE 102007037862 A1 10/2008
DE 102008062827 A1 7/2010
DE 102013200468 A1 7/2014

* cited by examiner

LIGHTING ARRANGEMENT FOR A MOTOR VEHICLE

CROSS REFERENCE TO RELATED APPLICATIONS

Priority is claimed to German Patent Application No. DE 10 2014 113 491.5, filed on Sep. 18, 2014, the entire disclosure of which is hereby incorporated by reference herein.

FIELD

The present invention relates to a lighting arrangement for a motor vehicle, in particular a headlight for a motor vehicle, comprising a lighting chamber in which a light source for supplying light is arranged, wherein the lighting chamber has a light-permeable section and a ventilation opening with a filtering membrane, and a ventilation arrangement which is assigned to the ventilation opening in order to supply ambient air through the ventilation opening to the lighting chamber.

The present invention furthermore relates to a motor vehicle with a lighting arrangement.

BACKGROUND

It is generally known in the field of motor vehicle headlight technology that moisture can collect in the headlight housing and accordingly condenses on an inner surface of the headlight glass. In order to reduce such accumulations of moisture in the headlight housing, the headlight housings customarily have one or more ventilation openings in order to ensure an exchange of air with the surroundings and to remove moisture from the headlight housing. In order to prevent dust and dirt particles from penetrating through the ventilation openings, the latter are customarily covered by a filtering membrane such that air and moisture can be exchanged with the surroundings, but dust and dirt particles can only enter to a small extent, if at all, into the headlight housing. A headlight of this type with a ventilation opening is known, for example, from U.S. Pat. No. 5,700,080.

A disadvantage of the known headlight housings with a single ventilation opening is that the air in the headlight housing is exchanged only passively by means of diffusion with the ambient air or the ambient air is supplied to the ventilation opening in an uncontrolled manner.

SUMMARY

In an embodiment, the present invention provides a lighting arrangement including a lighting chamber having a light-permeable section and a ventilation opening with a filtering membrane. A light source for supplying light is arranged in the lighting chamber. A ventilation arrangement is assigned to the ventilation opening so as to supply ambient air through the ventilation opening to the lighting chamber. The ventilation arrangement includes an air outlet opening assigned to the ventilation opening of the lighting chamber so as to supply the ambient air to the ventilation opening. A distance between the air outlet opening and the filtering membrane is configured so as to be adjustable.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
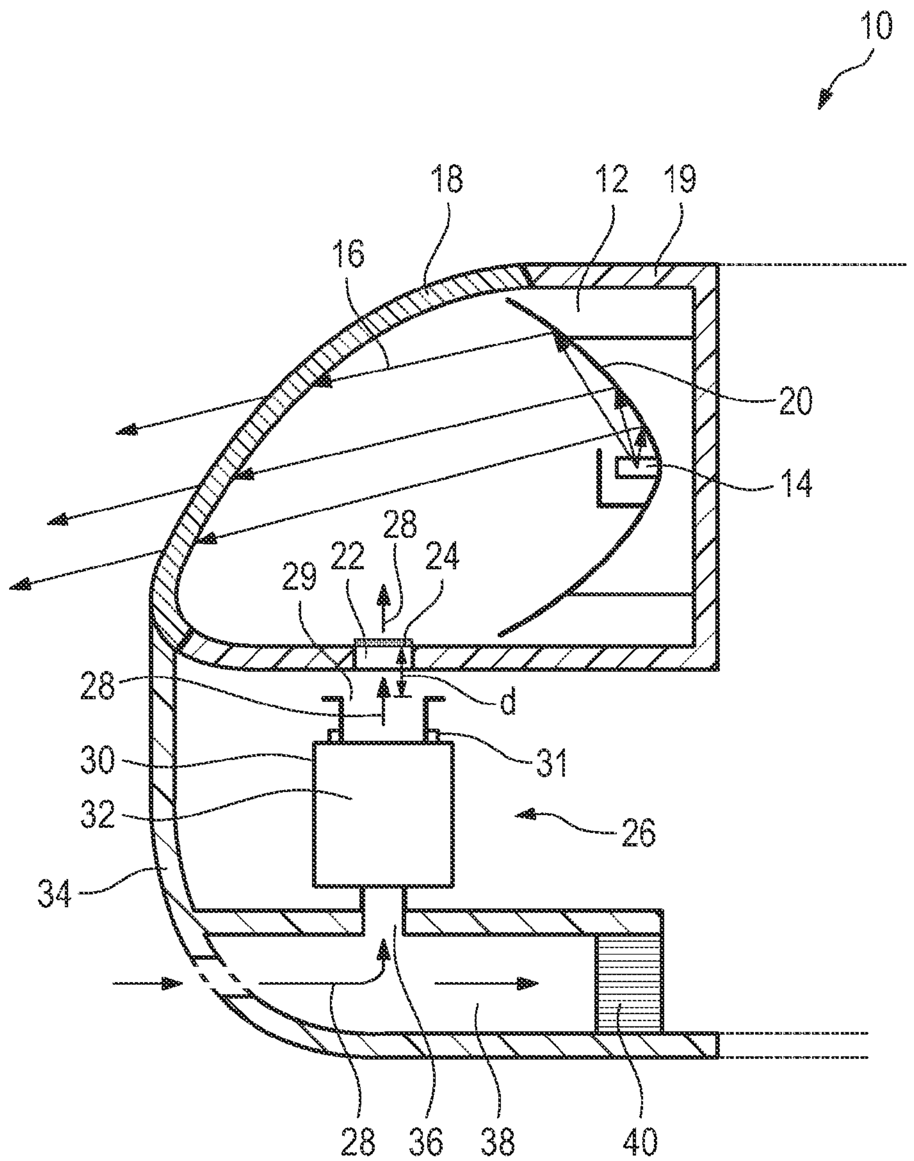
FIG. 1 shows a schematic sectional view of a lighting arrangement for a motor vehicle.

An aspect of the present invention is to supply a lighting arrangement for a motor vehicle, in which an exchange of air of the lighting chamber is improved.

In an embodiment, the present invention provides a lighting arrangement in which a ventilation arrangement has an air outlet opening which is assigned to the ventilation opening of the lighting chamber in order to supply the ambient air to the ventilation opening, wherein a distance between the air outlet opening and the filtering membrane is designed to be adjustable.

Owing to the fact that the air outlet opening of the ventilation arrangement is assigned to the ventilation opening of the lighting chamber, ambient air can be correspondingly supplied to the lighting chamber, wherein a flow velocity of the supplied ambient air can be adjusted by means of a variation in the distance between the air outlet opening and the filtering membrane. As a result, the ventilation of the lighting chamber can be controlled and can be adapted to various situations, and therefore the exchange of air of the lighting chamber is improved as a whole.

In an embodiment, the air outlet opening is mounted movably relative to the ventilation opening, wherein a distance between the air outlet opening and the ventilation opening is adjustable.

The flow velocity of the ambient air which is supplied to the ventilation opening can thereby be adjusted and adapted with technically little outlay.

It is preferred here if the air outlet opening is mounted movably on an outer panel element of the motor vehicle.

As a result, the air outlet opening can be mounted adjacent to the lighting chamber with technically little outlay and the distance between the air outlet opening and the ventilation opening can be precisely adjusted with technically little outlay.

In an embodiment, the air outlet opening is spaced apart from the ventilation opening.

The connection of the air outlet opening to the ventilation opening can thereby be supplied with technically little outlay since a relatively large tolerance is possible.

In an embodiment, the ventilation arrangement has a ventilation duct which is connected to the air outlet opening, wherein a duct diameter of the ventilation duct is designed to be adjustable.

The flow velocity from the air outlet opening into the ventilation opening can thereby be adjusted particularly precisely with technically little outlay.

In an embodiment, the air outlet opening is of funnel-shape design.

As a result, the size of the air outlet opening can be adapted to the size of the ventilation opening with technically little outlay.

It is preferred here if the funnel-shaped air outlet opening opens in the direction of the ventilation opening.

The air outlet opening can thereby be adapted to a particularly large ventilation opening with technically little outlay.

In an embodiment, the ventilation opening is of funnel-shape design and is arranged opposite the air outlet opening.

The ambient air supplied to the ventilation opening can thereby be introduced into the lighting chamber with technically little outlay.

In an embodiment, the air outlet opening forms an air exit area which corresponds to an effective area of the filtering membrane.

The air flow can thereby be adapted to the filtering membrane with technically little outlay.

In an embodiment, the ventilation arrangement has a condensation arrangement which is designed to dehumidify the ambient air and to supply the dehumidified ambient air to the lighting chamber.

Condensation of moisture in the lighting chamber can thereby be avoided.

It is preferred here if the condensation arrangement is thermally connected to an outer panel of the motor vehicle in order to cool the condensation arrangement.

The ambient air can thereby be dehumidified with technically little outlay in order to supply the dehumidified ambient air to the lighting chamber.

In an embodiment, the ventilation arrangement has an air inlet opening which is arranged on the motor vehicle in such a manner that the ambient air is supplied to the ventilation arrangement by means of a movement of the motor vehicle.

In other words, the ambient air is supplied to the air inlet opening by the slipstream of the motor vehicle during the journey.

The ambient air is thereby supplied to the ventilation arrangement without additional outlay, and therefore ventilation of the lighting chamber can take place automatically.

Overall, the ventilation of the lighting chamber can be optimized since a flow velocity of the ambient air which is supplied to the ventilation opening can be adjusted depending on the situation, and therefore optimum ventilation of the lighting chamber can be achieved, and therefore, as a result, condensation of moisture in the lighting chamber and in particular on the light-permeable section can be prevented.

It goes without saying that the features mentioned above and those which have yet to be explained below can be used not only in the respectively stated combination, but also in different combinations or on their own without departing from the scope of the present invention.

In FIG. 1, a lighting arrangement for a motor vehicle is shown in a schematic sectional view and is denoted in general by 10. In this case, the lighting arrangement is a motor vehicle headlight arrangement. The lighting arrangement 10 in general has a lighting chamber 12 in which lamps 14 are arranged as a light source for supplying light 16. The lighting chamber 12 is designed as a housing or hollow body and has a light-permeable section 18 in order to emit the light of the lamps 14 from the lighting chamber 12 and accordingly to light the surroundings of the motor vehicle. The lighting arrangement 10 has a frame 19 which forms a part of the housing on which the lamps 14 and the light-permeable section are mounted. In the embodiment illustrated here of the front headlight arrangement, a curved mirror 20 which projects the light 16 of the lamps 14 outward through the light-permeable section 18 is arranged in the lighting chamber 12. It goes without saying that the present invention can also be used in any other form of light projection, such as, for example, light projection by means of a lens optic.

The lighting chamber 12 or the frame 19 furthermore has a ventilation opening 22 which connects an interior of the lighting chamber 12 to the surroundings and through which air from the interior can be exchanged with the surroundings, as is explained in more detail below. A filtering membrane 24 is arranged in the ventilation opening 22 in order to catch dust and dirt particles and in order to prevent the dust and dirt particles from passing into the interior of the lighting chamber 12.

The ventilation opening 22 is assigned a ventilation arrangement 26 which is designed to supply ambient air 28 to the ventilation opening 22 and to guide said ambient air through the ventilation opening 22 into the interior of the lighting chamber 12. The ventilation arrangement 20 has an air outlet opening 29 which is arranged opposite the ventilation opening 22 in order to supply the ambient air 28 to the ventilation opening 22. The air outlet opening 29 and the filtering membrane 24 in the ventilation opening 22 are arranged spaced apart from each other and are at a distance d from each other, wherein the distance d is adjustable. A flow velocity of the ambient air 28 into the ventilation opening 22 or through the filtering membrane 24 can thereby be adjusted and controlled. The air outlet opening 29 is preferably mounted movably relative to the ventilation opening 22, and therefore a distance between the air outlet opening 29 and the ventilation opening 22 is adjustable and controllable. The flow velocity of the ambient air 28 into the ventilation opening 22 or through the filtering membrane 24 can thereby be controlled depending on the situation. The air outlet opening 29 is preferably mounted movably here by means of a bearing arrangement 31, and therefore the distance d from the filtering membrane 24 or the distance from the ventilation opening 22 can be varied.

The ventilation opening 22 has a condensation arrangement 30 with a condensation chamber 32 through which the ambient air 28 is guided and in which moisture of the ambient air 28 condenses, and therefore the ambient air 28 dehumidified in this manner can be supplied through the ventilation opening 22 to the lighting chamber 12.

The condensation of the ambient air 28 in the condensation chamber 32 takes place or is supported by cooling of the condensation chamber 32, as is explained in more detail below.

The ventilation arrangement 26 is generally arranged within an outer panel 34 of the motor vehicle, wherein the outer panel 34 forms a front panel in the embodiment illustrated here. The ventilation arrangement 26 has an air inlet opening 36 through which the ambient air 28 flows into the ventilation arrangement. The air inlet opening 36 is arranged on an inflow duct 38 for a radiator 40 of the motor vehicle in such a manner that a dynamic air pressure is produced in the inflow duct 38 upstream of the radiator 40 by means of the movement of the motor vehicle or by means of the slipstream, and the ambient air 28 can flow into the air inlet opening 36 or is supplied to the ventilation arrangement 26.

As a result, dehumidified ambient air 28 can be continuously supplied to the lighting chamber 12 without additional support during the journey of the motor vehicle, and therefore an entry of moisture into the lighting chamber 12 can be reduced and condensing of moisture, in particular on the light-permeable section 18, can be avoided.

Figure 2:
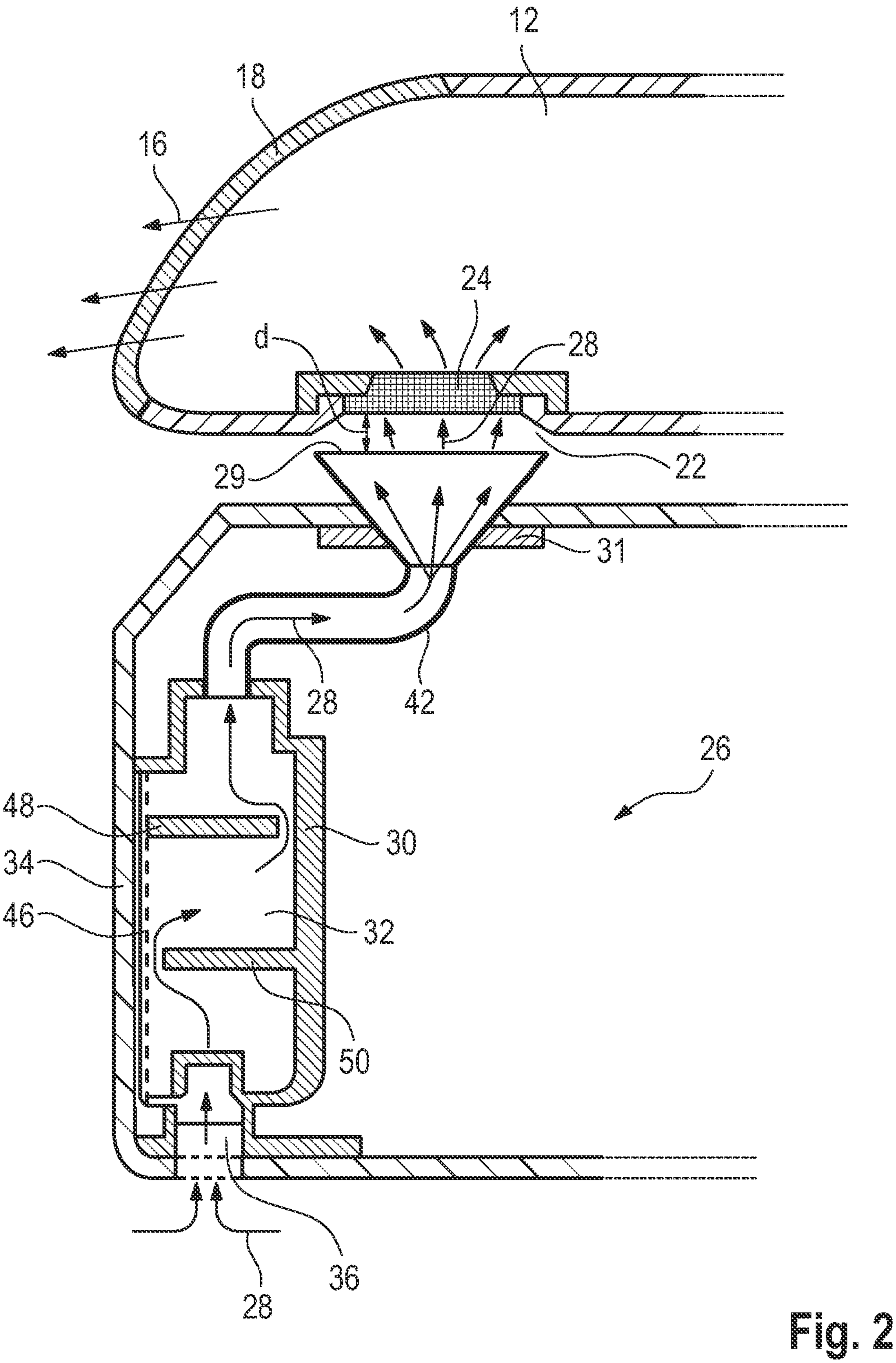
FIG. 2 shows a detailed sectional view of a lighting arrangement and of a front panel of a motor vehicle.

FIG. 2 illustrates a detailed sectional view of the lighting arrangement 10. Identical elements are denoted by the same reference numbers, with only the special characteristics being explained here.

The condensation chamber 32 is connected to an air outlet opening 29 of the ventilation arrangement 26 via a ventilation duct 42. The air outlet opening 29 is of funnel-shape design, and the funnel-shaped air outlet opening 44 is assigned to the ventilation opening 22 of the lighting chamber 12 in such a manner that the ambient air 28 can flow from the air outlet opening 29 through the ventilation opening 22 into the lighting chamber 12. The air outlet opening 29 is spaced apart from the filtering membrane 24 and the ventilation opening 22, wherein an inflow velocity of the ambient air 28 into the ventilation opening 22 is adjustable by means of the distance d between the air outlet opening and the filtering membrane 24 or by means of a distance between the air outlet opening 22 and the ventilation opening 24. The distance between the air outlet opening 29 and the filtering membrane 24 or the ventilation opening 22 is varied depending on the situation in order to control an optimum flow velocity of the ambient air 28.

Furthermore, the flow velocity of the ambient air 28 into the ventilation opening 22 can be determined by a flow diameter of the ventilation duct 42, which flow diameter is varied in order to control the flow velocity of the ambient air 28 depending on the situation.

The condensation chamber 32 is arranged on an inner wall of the outer panel 34 and is thermally connected to the outer panel 34, wherein a condensation section 46, on which the moisture of the ambient air 28 condenses, is correspondingly formed in the condensation chamber 32 on the inner side of the outer panel. The condensation section 46 is designed here as a condensation trap. The condensation section 46 is thermally connected to the outer panel 34, and therefore the condensation section 46 is cooled, and condensation of the moisture from the ambient air 28 is supported, by the slipstream which flows along the outer panel 34, and by precipitation and spray water which strikes against the outer panel 34.

Two water separation elements 48, 50 are arranged in the condensation chamber 32 and are oriented orthogonally to a general direction of flow of the ambient air 28 in the condensation chamber 32. The water separation elements 48, 50 are arranged offset with respect to each other in such a manner that the ambient air 28 is guided past both the condensation section 46 and past an opposite wall of the condensation chamber 32. The condensed moisture can thereby be separated in the condensation chamber 32 and removed from the condensation chamber 32.

At the air inlet opening 36, the ambient air 28 is introduced into the condensation arrangement 30 by the dynamic pressure at the motor vehicle radiator 40 and can accordingly be supplied dehumidified to the ventilation opening 22 and introduced into the lighting chamber 12.

Overall, by means of the condensation arrangement 30 which is cooled by the external air of the motor vehicle, the moisture of the ambient air 28 can be condensed and the ambient air 28 supplied in dehumidified form, as a result of which condensation on the light-permeable section 18 can be avoided.

The air outlet opening 29 is of funnel-shape design, wherein the air outlet opening 29 opens in a funnel-shaped manner toward the ventilation opening 22. The ventilation opening 22 which has the filtering membrane 24 is of funnel-shape design, wherein the funnel-shaped ventilation opening 22 opens toward the air outlet opening 29 of the ventilation arrangement 26. The air outlet opening 29 and the ventilation opening 22 are accordingly arranged opposite each other, and therefore the ambient air 28 can flow from the air outlet opening 29 through the filtering membrane 24 into the lighting chamber 12. The air outlet opening 29 or the funnel of the air outlet opening 29 is mounted movably on the outer panel 34 by means of the bearing arrangement 31, and therefore the distance d between the air outlet opening 29 and the filtering membrane 24 is adjustable and the flow velocity of the ambient air 28 into the filtering membrane 24 or into the lighting chamber 12 can be controlled via the distance d.

The air outlet opening 29 is spaced apart from the ventilation opening 22, wherein the distance of the air outlet opening 29 and of the ventilation opening 22 is adjustable via the bearing arrangement 31.

The size of the air outlet opening 29 and of the ventilation opening 22 are matched to each other, and therefore a flow velocity can be optimally set by the filtering membrane 24.

Overall, by means of the individual adjustment of the flow velocity of the ambient air 28, the lighting chamber 12 can be ventilated optimally and depending on the situation, and therefore condensation of moisture in the lighting chamber 12 and in particular on the light-permeable section 18 is avoided.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A lighting arrangement for a motor vehicle, comprising:

a lighting chamber including a light-permeable section and a ventilation opening with a filtering membrane;

a light source for supplying light arranged in the lighting chamber; and a ventilation arrangement assigned to the ventilation opening so as to supply ambient air through the ventilation opening to the lighting chamber, the ventilation arrangement including an air outlet opening assigned to the ventilation opening of the lighting chamber so as to supply the ambient air to the ventilation opening, wherein a distance between the air outlet opening and the filtering membrane is configured so as to be adjustable.

2. The lighting arrangement as claimed in claim 1, wherein the air outlet opening is mounted movably relative to the ventilation opening, wherein a distance between the air outlet opening and the ventilation opening is adjustable.

3. The lighting arrangement as claimed in claim 2, wherein the air outlet opening is mounted movably on an outer panel element of the motor vehicle.

4. The lighting arrangement as claimed claim 1, wherein the air outlet opening is spaced apart from the ventilation opening.

5. The lighting arrangement as claimed in claim 1, wherein the ventilation arrangement has a ventilation duct that is connected to the air outlet opening, wherein a duct diameter of the ventilation duct is configured to be adjustable.

6. The lighting arrangement as claimed in claim 1, wherein the air outlet opening has a funnel-shape design.

7. The lighting arrangement as claimed in claim 6, wherein the funnel-shaped air outlet opening opens in the direction of the ventilation opening.

8. The lighting arrangement as claimed in claim 1, wherein the ventilation opening has a funnel-shape design and is disposed opposite the air outlet opening.

9. The lighting arrangement as claimed in claim 1, wherein the air outlet opening forms an air exit area which corresponds to an area of the filtering membrane.

10. The lighting arrangement as claimed in claim 1, wherein the ventilation arrangement has a condensation arrangement configured to dehumidify the ambient air and to supply the dehumidified ambient air to the lighting chamber.

11. The lighting arrangement as claimed in claim 10, wherein the condensation arrangement is thermally connected to an outer panel of the motor vehicle in order to cool the condensation arrangement.

12. The lighting arrangement as claimed in claim 1, wherein the ventilation arrangement has an air inlet opening which is disposed on the motor vehicle so as to supply the ambient air to the ventilation arrangement by means of a movement of the motor vehicle.

13. A motor vehicle including a lighting arrangement comprising:

a lighting chamber including a light-permeable section and a ventilation opening with a filtering membrane;

a light source for supplying light arranged in the lighting chamber; and a ventilation arrangement assigned to the ventilation opening so as to supply ambient air through the ventilation opening to the lighting chamber, the ventilation arrangement including an air outlet opening assigned to the ventilation opening of the lighting chamber so as to supply the ambient air to the ventilation opening, wherein a distance between the air outlet opening and the filtering membrane is configured so as to be adjustable.

* * * * *